(12) United States Patent  
Pelly

(10) Patent No.: US 7,089,422 B2  
(45) Date of Patent: Aug. 8, 2006

(54) EMBEDDING DATA IN AN INFORMATION SIGNAL

(75) Inventor: Jason Charles Pelly, Reading (GB)

(73) Assignee: Sony United Kingdom Limited, Weybridge (GB)

( * ) Notice: Subject to any disclaimer, the term of this patent is extended or adjusted under 35 U.S.C. 154(b) by 364 days.

(21) Appl. No.: 10/603,308

(22) Filed: Jun. 25, 2003

(65) Prior Publication Data

US 2004/0010670 A1    Jan. 15, 2004

(30) Foreign Application Priority Data

Jun. 28, 2002   (GB) ................................ 0215071.2

(51) Int. Cl.  
*G06F 12/14* (2006.01)
(52) U.S. Cl. ...................... 713/184; 713/202; 713/182; 711/164
(58) Field of Classification Search ................. 713/184  
See application file for complete search history.

(56) References Cited

U.S. PATENT DOCUMENTS 4,918,653 A * 4/1990 Johri et al. .................... 726/23
5,161,210 A   11/1992 Druyvesteyn et al.
5,761,301 A   6/1998 Oshima et al.
6,879,965 B1 * 4/2005 Fung et al. .................... 705/39

FOREIGN PATENT DOCUMENTS

WO    WO 00/51348    8/2000

* cited by examiner

*Primary Examiner*—B. James Peikari  
(74) *Attorney, Agent, or Firm*—Oblon, Spivak, McClelland, Maier & Neustadt, P.C.

(57) ABSTRACT

The present invention controls copying of an information signal, comprises the steps of prior to recording and/or transmission, applying to the information signal a substantially imperceptible modification representing copy control data including a password securely encoded according to a predetermined algorithm; upon reproduction for copying by a user, deriving (S1, S3) the copy control data from the modified information signal; comparing (S8, S9, S11, S13, S15) the derived securely encoded password with a reference password securely encoded according to a predetermined algorithm; and enabling (S5) copying of the information signal if the securely encoded password derived from the information signal and the securely encoded reference password have a predetermined relationship, otherwise disabling copying (S7). The reference password is sent to the user via a channel, which is separate from a channel used to send the information signal to the user.

31 Claims, 5 Drawing Sheets

EMBEDDING DATA IN AN INFORMATION SIGNAL

BACKGROUND OF THE INVENTION

1. Field of the Invention

The present invention relates to embedding data in an information signal. Examples of the invention relate to: a method of and system for controlling copying of an information signal; an information signal; a data carrier on which an information signal is recorded; apparatus for modifying an information signal; a reproducing apparatus; and a computer program.

2. Description of the Prior Art

U.S. Pat. No. 5,161,210 (US Philips Corporation) discloses a system for inhibiting copying of audio signals. An audio signal is divided into frequency sub-bands and sub-band samples are quantized. The quantized samples are combined with samples of an auxiliary signal. The combined audio signal is recorded on a record carrier or transmitted. The auxiliary signal is inaudible in the combined audio signal. An audio signal reproducer having a recording unit also has a unit for detecting the auxiliary signal and generating a record control signal. The recording unit is constructed so that if a record control signal appears on its record control input the recording unit does not record the audio signal.

WO 00/51348 (Macrovision) discloses a method and apparatus for inhibiting copying of audio or video signals transmitted over a cable television or direct satellite broadcast or the Internet. The signal is protected from unwanted copying by the combination of a watermark embedded in the signal at the head end together with additional copy protection data inserted in the signal. The additional data is a ticket. If the consumer pays a fee, the signal is transmitted to the consumer. The consumer can record only if the watermark and a mathematical function of the ticket match. The function is for example a hash function.

SUMMARY OF THE INVENTION

According to one aspect of the present invention there is provided a method of controlling copying of an information signal in a system having a source of the information signal and a device for copying the information signal, the method comprising the steps of:

at an information signal modification source, prior to transmission of the information signal to the copying device, generating a copy control password and a related reference password, and applying to the information signal a substantially imperceptible modification representing copy control data including the copy control password securely encoded according to a predetermined algorithm;

delivering the modified information signal from the modification source to the copying device via a communications channel;

delivering the reference password from the modification source to the copying device via a separate communications channel independent of the modified information signal;

upon reception of the modified signal deriving the copy control data from the modified information signal;

comparing the derived securely encoded password with the separately provided reference password securely encoded according to a predetermined algorithm; and enabling copying of the information signal if the securely encoded password derived from the information signal and the securely encoded reference password have a predetermined relationship.

Thus the present invention provides for conditional control of recording of an information signal instead of, or in addition to, simple denial of any recording and simple complete freedom to record or otherwise copy. Recording may be any form of storage including but not limited to storage on a linear data carrier, for example magnetic tape.

Furthermore, the reference password is not in the information signal or on any carrier of the information signal but is provided to the copying device independently of the information signal.

The information signal may represent any one of, or a combination of, image information (including still and moving images), audio, video, text, and data which may be executable or otherwise.

In examples of the invention the said copy control data includes other data indicating that copying is permitted subject to the provision by a user of a correct reference password.

The reference password is preferably securely encoded according to the same algorithm as the password derived from the information signal. The said predetermined algorithm may be an encryption algorithm. Preferably the said algorithm is a hash function in which case the reference password and the password derived from the information signal are the same. The reference password may be delivered to the copying device as a plain password or securely encoded, e.g. encrypted in which case it is decrypted at the copying device.

The reference password may be provided via a secure communications channel which is separate from the transmission channel of the information signal.

In an example of the invention, the reference password is provided to a user who wishes to copy the information signal. The password may be provided on a secure data carrier, e.g. a smart card or in some other, preferably secure, way. If provided on a smart card the reference password can be kept secure even from the user. The user provides the password to the copying device via an input device , e.g. a keyboard or a card reader. The user may be prompted to provide the password. Preferably that is done in response to the copy control data which indicates that copying is conditional upon the provision of the password. Thus the user is required to take positive action if they wish to copy an information signal for which copying is conditionally allowed.

A second aspect of the invention provides a method of applying copy control data to an information signal comprising the steps of:

determining whether copying of the information signal is allowed, not allowed or conditionally allowed; and applying to the signal a substantially imperceptible modification representing copy control data, the copy control data comprising a) first data if copying is allowed, b) second data if copying is not allowed, and c) third data if copying is conditionally allowed, the third data including at least a password securely encoded according to a predetermined algorithm.

A third aspect of the invention provides a method of controlling the operation of a signal copying device having a recording unit controlled by a processor, the copying device being operable to record an information signal produced by the method of the second aspect, the method comprising the steps of:

using the processor to derive the copy control data from the information signal and to determine whether the control data is the first, second or third data and to a) allow the recording unit to record if the first data is present in the information signal, b) disable the record unit if the second data is present in the information signal; and c) allow the recording unit to record if the third data is present in the information signal and a reference password is provided which when securely encoded by a predetermined algorithm has a predetermined relationship to the said securely encoded password of the third data.

The second and third aspects of the present invention provide copy control data which explicitly indicates, and allows, conditional control of recording of an information signal and, in addition, simple denial of any recording and simple complete freedom to record.

It is possible that the copying device receives an information signal which does not have an imperceptible modification representing copy control data. In that case the copying device may be arranged to allow copying (or in the alternative not allow copying).

The copy control data may be used to control the copying device to operate in a predetermined manner. For example it may control the form of any copies for example indicating the form of copy control data to be included in any copy.

These and other aspects of the invention are set out in the accompanying claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
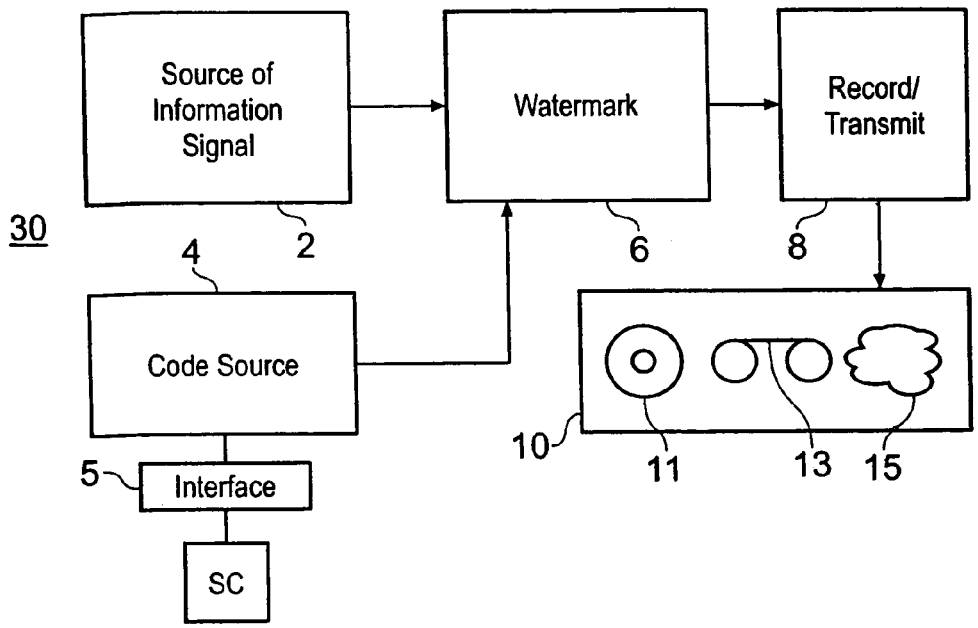
FIG. 1 is a schematic block diagram of an illustrative apparatus for applying a modification to an information signal in accordance with the invention.

Referring to FIG. 1, a signal modifying apparatus 30 comprises a source 2 which produces an information signal which may be for example an audio signal, a video signal, an audio/video signal, a data signal and/or an image signals. The source 2 may be any suitable source for example a signal reproducer which reproduces the signal from a record or an original source for example a camera in the case of video or microphone in the case of audio.

For ease of explanation the following description assumes the information signal is a video signal, but the invention is not limited to video.

A watermarking apparatus 6 receives the video signal from the source 2 and applies to it copy control data from a source 4. In this example the watermarking apparatus 6 embeds the copy control data in the video in such a way that the embedded data is substantially imperceptible in the video. Watermarking techniques are known in the art of video and an example of such a technique is described below with reference to FIG. 5 but any other suitable known watermarking technique may be used.

The watermarking apparatus may optionally embed as a watermark provenance data, metadata, or other data in addition to the copy control data.

The copy control data is embedded for the purpose of controlling copying of the video signal. In one example of the invention, the data comprises a code h which is a hash function H(p) of a password p: i.e. the code h=H(p). In another example of the invention, the control data h is associated with further data, for example 01 or 10, which indicates the presence of the code h.

In an example of the invention, the copy control data comprises a selected one of the following copy status codes:

00 which indicates no copying is allowed;

11 which indicates copying is freely allowed; and 01 or 10 together with code h which indicates that copying is allowed provided a reference password is provided which when hashed by the hash function H matches the code h.

The codes 00, 11 and 10 or 01 are examples of codes for simplicity of explanation. More complex codes may be used, Preferably codes which are unlikely to occur by chance are used.

The following description describes the currently preferred example but the invention is not limited to that example.

The video into which the control data is embedded by the watermarking apparatus 6 is fed to a recorder or transmitter 8. If fed to a recorder, the recorder 8 may record the watermarked video on a data carrier for example a disc or tape or semiconductor memory. If transmitted, the transmitter 8 may be for example a broadcast apparatus or a server which transmits the watermarked video to a distribution system.

Reference numeral 10 indicates a schematic representation of a distribution system which may be amongst other examples: an electronic communications network 15 for transmitting the video e.g. a broadcast network, a PSTN or the Internet; or a physical distribution network via which tapes 13 or discs 11 or other data carriers on which the video is recorded are distributed.

The code source 4 also provides a reference password which in this example is the password p. The reference password p is fed via an interface 5 to a secure data carrier, e.g. a smart card SC for delivery to a user of the video separately from the video. It will be appreciated that the reference password could be delivered by other means, e.g. another form of data carrier, on paper through the post or via the Internet or telephone system.

Figure 2:
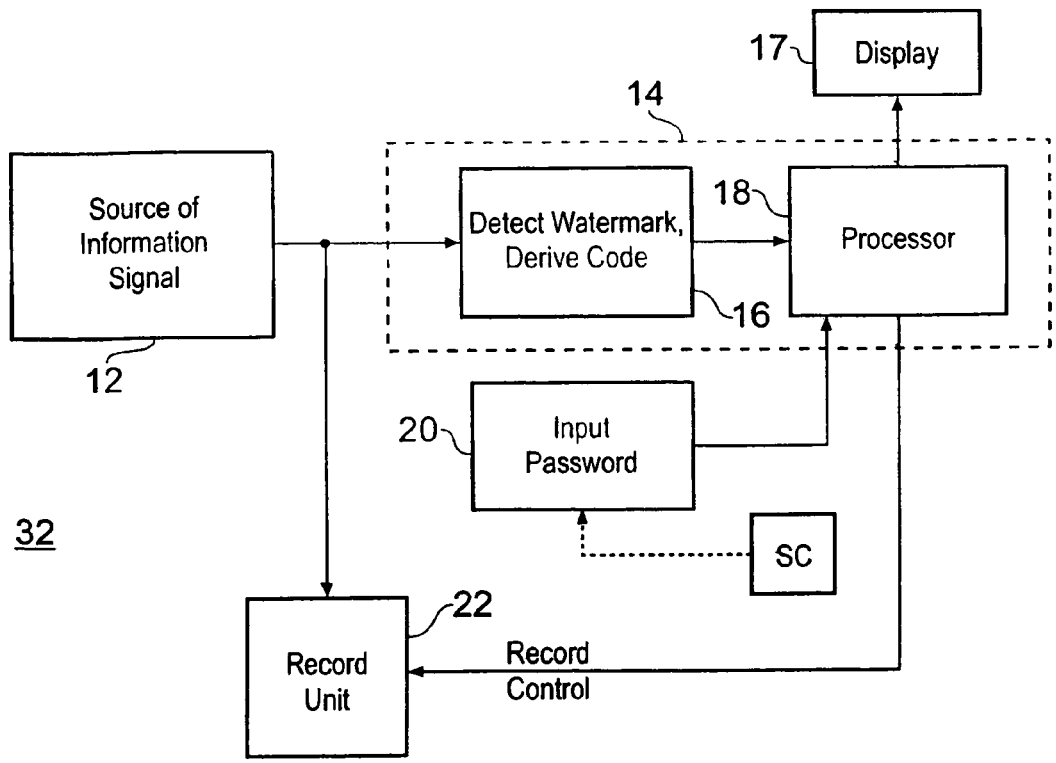
FIG. 2 is a schematic block diagram of an illustrative signal reproducing and recording apparatus in accordance with the invention.

FIG. 2 illustrates a copying device which in this example is a reproducing and recording apparatus 32. The apparatus 32 comprises a source 12 of video which may or may not be watermarked. The source 12 may reproduce the video from a data carrier or receive the video from a broadcast or other communications system as described above. The video is applied to a recording unit 22. The recording unit 22 is controlled by a record control signal produced by a control processor 14.

Assume the video is watermarked.

The control processor 14 comprises a watermark processor 16 which detects the watermark and derives the copy control data therefrom. Watermark processors capable of doing that are known and an example is described with reference to FIG. 6 below. A processor 18 decodes the copy control data and applies the appropriate record control signal to the recording unit. The control processor also has an input device 20 for entering the reference password. The input device may be a keyboard, smart card reader, an interface with an electronic communications channel, amongst other examples. In addition a display 17 may be provided. The display is used in an example of the invention to prompt the user to enter the reference password via the input device, for example by inserting the smart card SC into the input device 20.

Figure 3A:
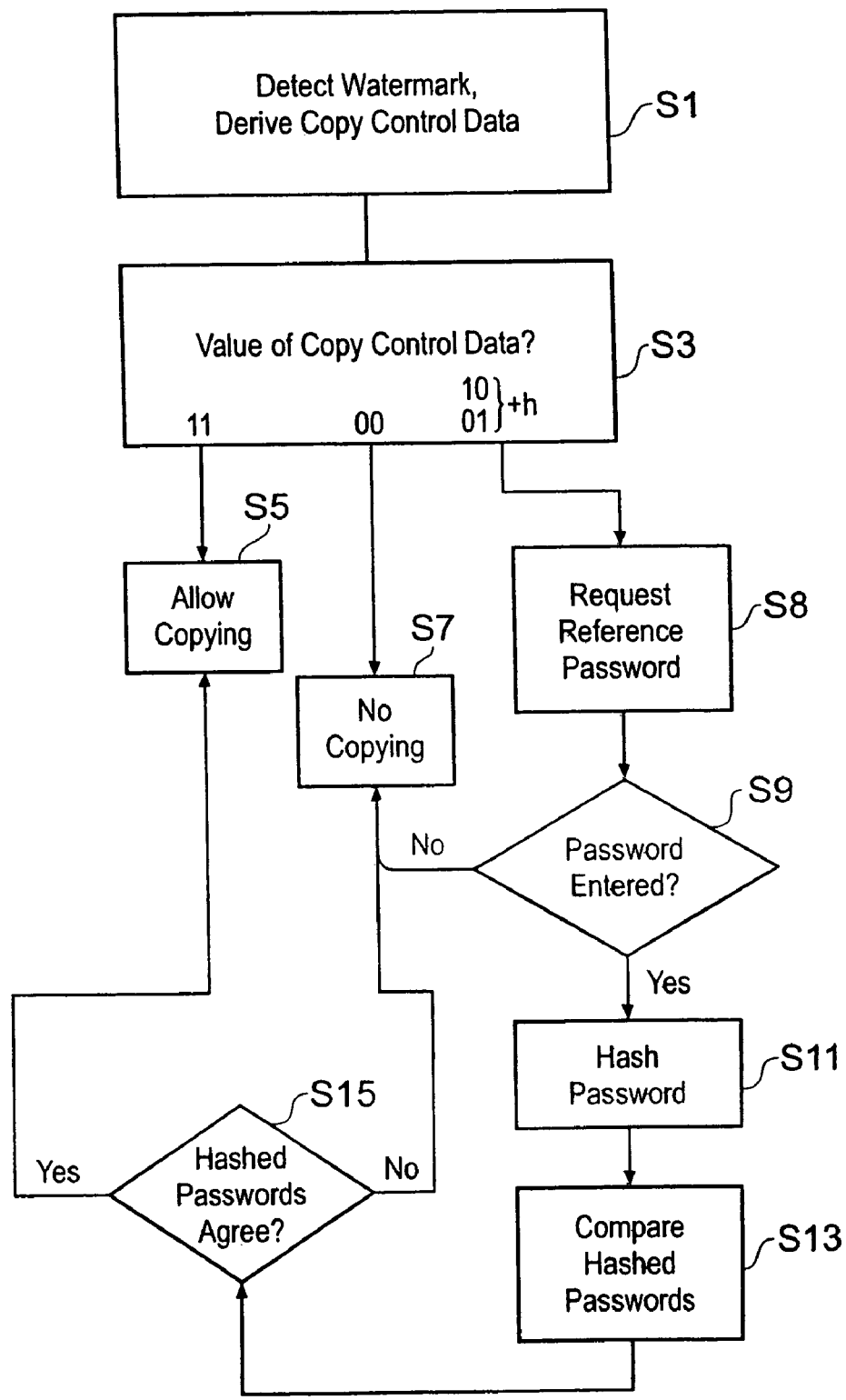
FIGS. 3A and B are flow diagrams illustrating an operation performed by a processor of the apparatus of FIG. 2.

Referring to FIGS. 3A and B, the control processor 14 operates as follows:

In step S1 the watermark processor 16 detects the watermark and derives the copy control data. In step S3 the processor 18 determines the value of the copy control data.

If the copy control data is:

00 then the record control signal is set S7 to disable the recording unit;

11 then the record control signal is set S5 to enable recording by the recording unit; and 01 or 10 together with a code of any value then the user is requested S8 to provide a reference password p'.

Figure 3B:
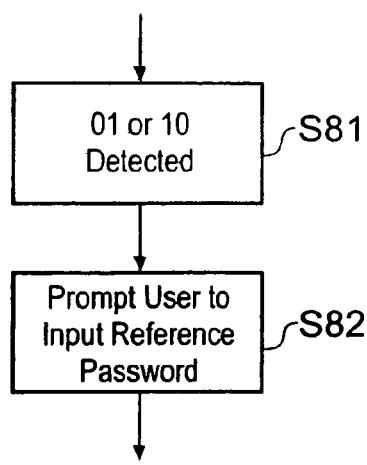

Referring to FIG. 3B, in step S81, the processor 18 detects whether the copy control data includes the code 01 or 10 indicating copying is allowed if the reference password is provided. If so, it causes a prompt to be displayed S82 by the display 17 requiring the user to enter the password.

If a reference password p' is entered S9 via an input device 20 the processor performs S11A hash function H(p') on the password and compares S13 the hashed reference password with the hash value h derived from the watermarked video. If the hashed values are the same S15 then copying is allowed S5. If the hashed values are not the same S15 then the recording unit is disabled S7.

If recording is enabled because the reference password is correct or because the copy control data=11, then the watermarked video including the original copy control data is recorded to provide copy control of the copy.

The user of the reproducing apparatus 32 requires the reference password to copy video which has as copy control data the code 01 or 10 plus the hash value h. As will be described with reference to FIG. 4, the reference password is supplied to the apparatus 32 separately from and independently of the watermarked video. In this example the password is provided on the smart card SC which is read by a card reader 20 which is the input device 20. This enables the password to be provided to a user and kept secret even from the user.

The smart card may be provided to a user on payment by the user of a fee.

The video form the source 12 may not have a copy control watermark. If the watermark processor 16 detects the absence of such a watermark, it indicates that to the processor 18; see step S1 of FIG. 3A). The absence of the watermark may be regarded as either indicating copying is not allowed so that the processor outputs code 00 to processor 18. Currently it is preferred that the absence of the watermark indicates copying is allowed. Thus the processor 16 outputs code 11 to the processor 18.

The system of FIGS. 1 and 2 is illustrated by way of example as a special purpose system but could be implemented using programmable data processors.

Figure 4:
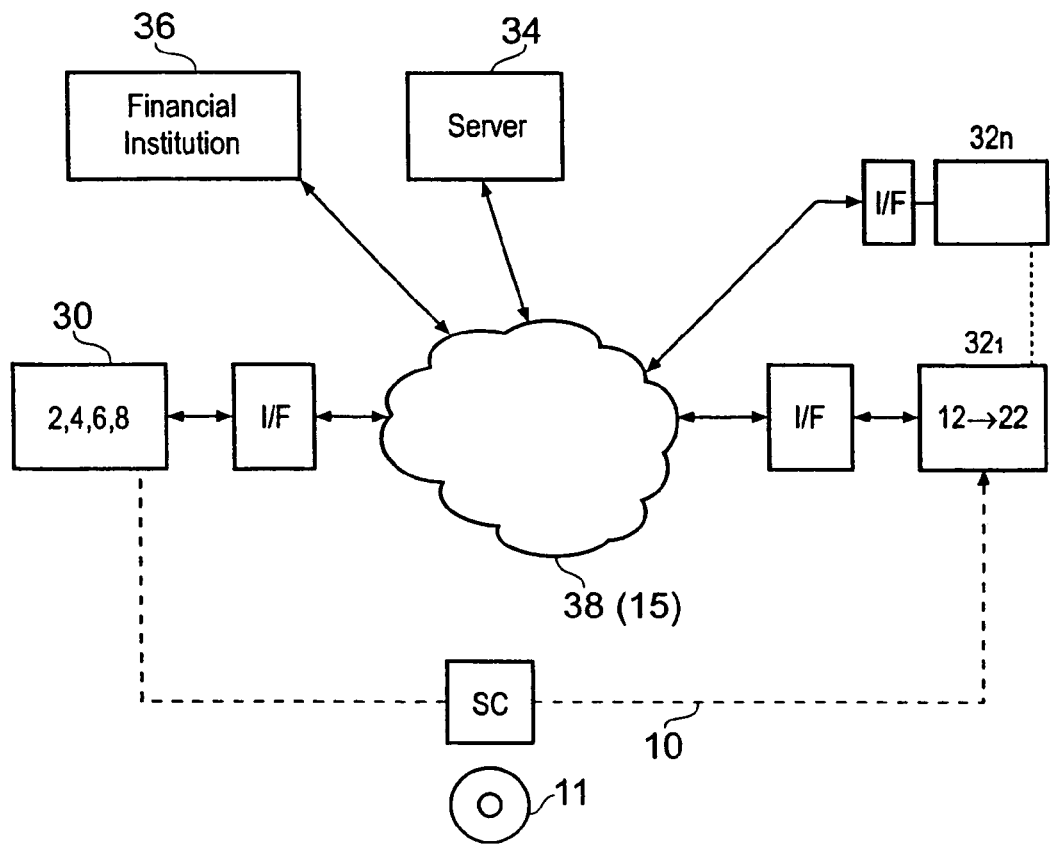
FIG. 4 is a schematic block diagram of an illustrative system for controlling copying in accordance with the invention.

In the system of FIG. 4, the modifying apparatus 30 and the reproducing apparatus 32 are linked by communications interfaces I/F to a communications network 38 which is for example the Internet. There may be many reproducing apparatus 321 to 32n connected to the network 38. For simplicity of description, it is assumed that the apparatus 30 is controlled by a seller and the user of the reproducing apparatus 32 is a buyer. Watermarked video is sent to buyers for example on a disc D via a distribution channel 10 for example a postal service or shop. If a buyer wishes to copy the watermarked video and it is watermarked with the copy control code 01 or 10 plus the hash value h, then the copy function in the reproducing apparatus 32 is disabled until the buyer pays a fee. The fee may be paid via the network 38 and a server 34, which for that purpose is linked to a financial institution 36, e.g. a credit card company.

The copy control hash values and/or the password may be unique to each user for increased security and traceability of unauthorised copies.

The payment of the fee is communicated to the seller via the network 38. The seller then releases the reference password for example on a smart card SC or in a secure manner via the communications network 38. Alternatively, the server may release the reference password on a smart card or via the network 38. For that purpose the server may communicate with the seller to obtain the reference password. It will be appreciated that the reference password could be delivered by other means, e.g. on a data carrier, on paper through the post or via the Internet or telephone system. Preferably the reference password is encrypted before transmission to the copying device 32 in which case it is decrypted at the copying device. Any known encryption system may be used.

The present invention assumes that all reproducing and recording apparatus are, equipped with watermark detection and decoding apparatus which disables the recording unit of the apparatus.

Figure 5:
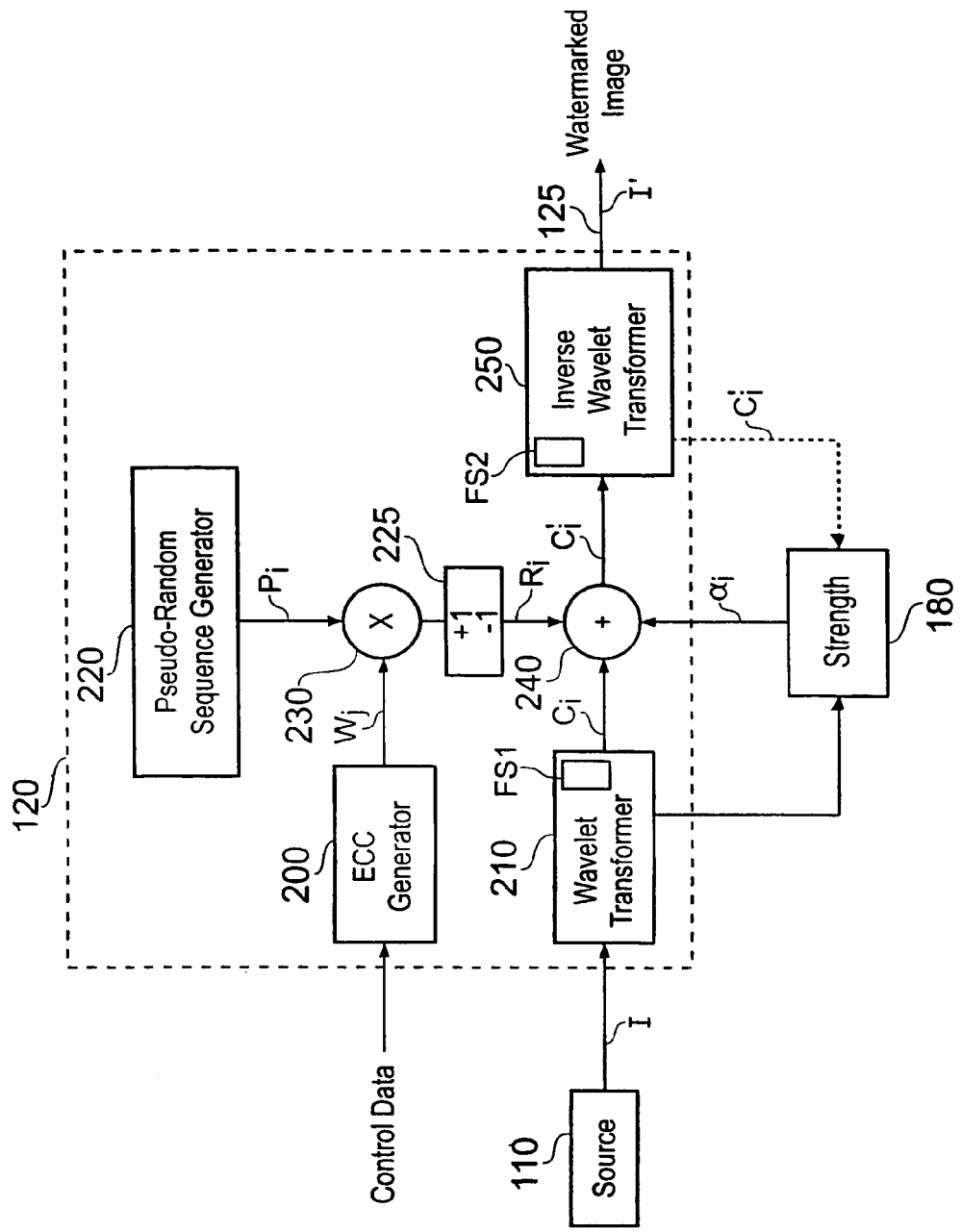
FIG. 5 is a schematic block diagram of an illustrative watermarking apparatus useful in the apparatus of FIG. 1.

Watermarking, FIG. 5

FIG. 5 illustrates the watermarking apparatus denoted as embedder 120 in more detail. The watermark embedder 120 comprises pseudo-random sequence generator 220, an error correction coding generator 200, a wavelet transformer 210, an inverse wavelet transformer 250, a first combiner 230, a data converter 225 and a second combiner 240. The wavelet transformer 210 includes a frame store FS1. The inverse transformer 250 includes a frame store FS2. The frame store FS1 stores a frame of unmodified coefficients Ci. The frame store FS2 stores a frame of modified coefficients Ci'.

The error correction coding generator 200 receives the copy control data and outputs an error correction coded copy control data to the first combiner 230. The pseudo-random sequence generator 220 outputs a pseudo-random binary sequence (PRBS) Pi, where i is the $i^{th}$ bit of the sequence, to the first combiner 230. The PRBS has a length L×J of bits where J is the number of bits in the error correction encoded copy control data. Each bit j of the error correction encoded copy control data then modulates a section of length L of the PRBS. The first combiner 230 logically combines the error correction encoded copy control data with the PRBS to produce a watermark having bits Ri. A bit Wj=0 of the error correction encoded copy control data inverts L bits of the PRBS. A bit Wj=1 of the error correction encoded copy control data does not invert the PRBS. Thus bits Wj of the error correction encoded copy control data are spread over L bits of the PRBS. The data converter 225 converts binary 1 to symbol +1 and binary 0 to symbol −1 to ensure that binary 0 bits contribute to a correlation value used in the decoder of FIG. 5.

The wavelet transformer 210 receives the video image I from the source 110 and outputs wavelet coefficients Ci to the second combiner 240.

The second combiner 240 receives the watermark Ri, the wavelet coefficients Ci and watermark strength αi and outputs modified coefficients Ci' where $$Ci' = Ci + \alpha i\, Ri$$

The inverse wavelet transformer 250 receives the modified coefficients Ci' and outputs a spatial domain watermarked image I'.

The embedder includes an ECC generator 200. The use of error correction coding to produce an error correction coded copy control data is advantageous since it allows the copy control data 175 to be reconstructed more readily should some information be lost. This provides a degree of robustness to future processing or attacks against the watermark. The use of a pseudo-random sequence Pi to generate a spread spectrum signal for use as a watermark is advantageous since it allows the error correction coded copy control data 205 to be spread across a large number of bits. Also, it allows the watermark to be more effectively hidden and reduces the visibility of the watermark. Applying the watermark to a wavelet transform of the image is advantageous since this reduces the perceptibility of the watermark. Furthermore, the strength of the watermark is adjusted by αi to ensure that the watermark is not perceptible.

Figure 6:
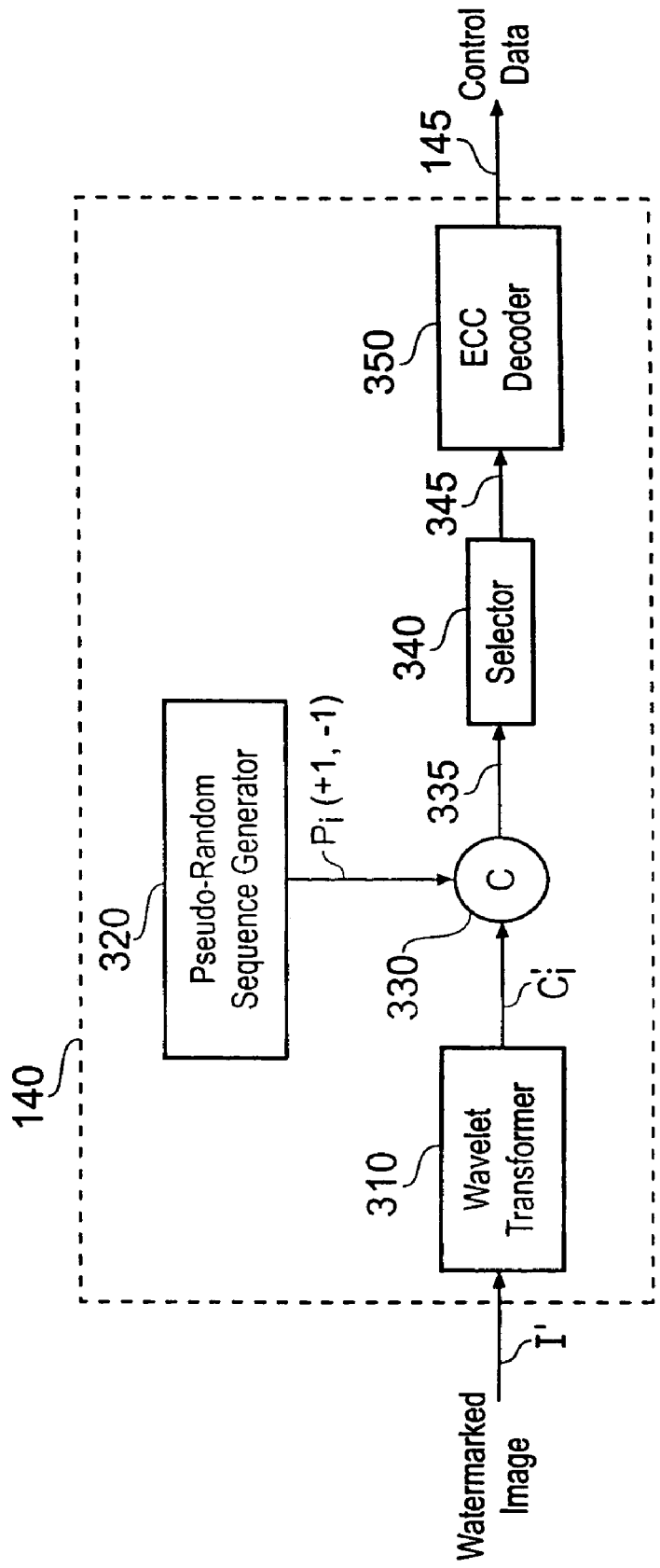
FIG. 6 is a schematic block diagram of an illustrative apparatus useful in the apparatus of FIG. 2 for detecting a watermark and extracting data therefrom.

Detecting Copy Control Data in Watermarked Video, FIG. 6

The operation of the watermark processor denoted as decoder 140 will now be explained in more detail with reference to FIG. 6. The watermark decoder 140 receives the watermarked image I' and outputs the restored copy control data. The watermark decoder 140 comprises a wavelet transformer 310, a reference pseudo-random sequence (PRBS) generator 320, a correlator 330, a selector 340 and a error correction coding decoder 350. The PRBS generated by the generator 320 is identical to that generated by the PRBS generator 220 of FIG. 2 and converted by a data converter (not shown) to values +1 and −1 as described above.

The wavelet transformer 310 receives the watermarked image I' and, in known manner, outputs the modified wavelet coefficients Ci'. The correlator 330 receives the reference pseudo-random sequence PRBS having symbols Pi of values +1 and −1 from the pseudo-random sequence generator 320, and the wavelet coefficients Ci' and outputs a watermark image bit correlation sequence 335. The watermarked image bit correlation sequence is determined in the following way.

The modified wavelet coefficients $Ci' = Ci + \alpha_i R_i$ where $R_i$ are bits of PRBS modulated by error-correction encoded bits Wj of copy control data. Each bit Wj modulates L bits of PRBS. There are JL bits in the modulated PRBS. For each error correction encoded bit Wj, the correlator 330 calculates a correlation value $$S'_j = \sum_{i=jL+1}^{jL+L} Ci' \cdot Pi$$

where j=0, 1, 2 . . . J−1, and J is the number of error correction encoded bits. A sequence 335 of correlation values S'$_j$ is produced.

The correlation sequence 335 is received by the selector 340 which outputs an uncorrected copy control data 345. The selector 340 outputs a bit value "1" for a value of S' greater than 0 and a bit value "0" for S' less than or equal to 0. The error correction code decoder 350 receives the uncorrected copy control data 345 and in known manner outputs the restored copy control data 145.

The reference PRBS Pi is synchronised with the modulated PRBS in the watermarked image. For that purpose a synchroniser (not shown) is used. Such synchronisation is known in the art.

Modifications

Although FIGS. 5 and 6 give an example of watermarking using Wavelet coefficients, the invention is not limited to Wavelets but can be implemented using other watermarking techniques including the use of DCT coefficients.

Although the invention has been illustrated by reference to FIGS. 1 to 4 which show schematics of special purpose hardware, it is envisaged that the invention may be implemented in software on programmable machines. Thus the invention also encompasses software which when run on suitable data processing equipment implements the functions described herein.

The information signal whether stored on a data carrier or sent as a signal via a communications channel may include several parts representing different sections of content or different items of content. For example a disc or tape typically has several tracks. In an embodiment of the invention each section may have its own copy control data embedded as an imperceptible watermark each with its own copy status and/or its own password. For example if a disc has tracks one to four the copy control data may be as follows:

| Track | Copy Status Data | Password |
| --- | --- | --- |
| Track 1 | 00 | — |
| Track 2 | 01 | nnnnnn |
| Track 3 | 01 | mmmmm |
| Track 4 | 11 | — |

Thus track 1 can be copied freely. Track 2 may be copied if the password nnnnn is provided. Track 3 may be copied if password mmmmm is provided, Copying of track five is not allowed. A user may be provided with only one of the passwords.

In a further embodiment, the copy status codes define copying rights for a user in addition to copying allowed, not allowed and conditionally allowed. For example code 01(plus the password) may indicate copying is conditionally allowed but the copies retain the original copy control data signifying the conditional copying status whereas code 10 may indicate copying is conditionally allowed and the copy may be freely copied, the copy control data not being retained in the first copy. Code 10 may be used to protect content whilst in transit between a supplier and the user for example.

Other status codes with passwords forming the copy control data may indicate other copying status.

In embodiments in which the copy status data is changed, the watermark must be amendable. Watermarks which may be removed are described in for example co-pending European patent application 1215880. The processors 16 and 18 in the control processor 14 of FIG. 2 are arranged to remove the original watermark and replace it with a new one. The new one may be permanent or removable.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of controlling copying of an information signal in a system having a source of the information signal and a device for copying the information signal, the method comprising the steps of:
   at an information signal modification source, prior to transmission of the information signal to the copying device, generating a copy control password and a related reference password, and applying to the information signal a substantially imperceptible modification representing copy control data including the copy control password securely encoded according to a predetermined algorithm;
   delivering the modified information signal from the modification source to the copying device via a communications channel;
   delivering the reference password from the modification source to the copying device via a separate communications channel independent of the modified information signal;
   upon reception of the modified signal deriving the copy control data from the modified information signal;
   comparing the derived securely encoded password with the separately provided reference password securely encoded according to a predetermined algorithm; and
   enabling copying of the information signal if the securely encoded password derived from the information signal and the securely encoded reference password have a predetermined relationship.

2. A method according to claim 1, wherein the reference password is securely encoded according to the same algorithm as the derived password.

3. A method according to claim 1, wherein the copy control data additionally includes other data indicating that copying is permitted if a correct reference password is provided.

4. A method according to claim 1, wherein the copy control password and the reference password are the same and the predetermined algorithm is a hash function.

5. A method according to claim 1, wherein the reference password is delivered to the copying device by the steps of providing the reference password to a user of the information signal who provides the reference password to the copying device.

6. A method according to claim 5, wherein the reference password is provided to the user if the user fulfils at least one predetermined condition.

7. A method according to claim 6, wherein the condition is payment for provision of the password.

8. A method according to claim 5, wherein the password is provided to the user via a secure communications channel.

9. A method according to claim 5, wherein the password is provided to the user on a secure data carrier.

10. A method according to claim 1, comprising the step of prompting the user to provide the password, the prompting of the user occurring in response to the derivation of the copy control data.

11. A method according to claim 1, comprising the step of storing the modified information signal on a data carrier for supply to the said user.

12. A method according to claim 1, wherein the modification is applied to the information signal by modifying transform coefficients of the information signal.

13. A method according to claim 12, wherein the said coefficients are DCT or Wavelet coefficients.

14. A method according to claim 1, wherein the information signal comprises any one or more of: image information, video information, audio information, text and data.

15. A system for controlling copying of an information signal the system having a source of the information signal and a device for copying the information signal and further comprising:
   an information signal modification apparatus operable, prior to transmission of the information signal to the copying device, to generate a copy control password and a related reference password, and apply to the information signal a substantially imperceptible modification representing copy control data including the copy control password securely encoded according to a predetermined algorithm;
   a communications channel for delivering the modified information signal from the modification source to the copying device; and
   a separate communications channel independent of the modified information signal for delivering the reference password from the modification source to the i copying device;
   wherein the copying device comprises a data processor and an input device for providing the reference password to the data processor, the data processor being operable to
   a) derive the copy control data from the modified information signal upon reception of the modified signal, and
   b) compare the derived securely encoded password with the separately provided reference password securely encoded according to a predetermined algorithm; and
   c) a copying unit enabled by the data processor to copy the information signal if the securely encoded password derived from the information signal and the securely encoded reference password have a predetermined relationship.

16. A system according to claim 15, wherein the data processor is arranged to securely encode the reference password according to the same algorithm as the derived password.

17. A system according to claim 15, wherein the predetermined algorithm is a hash function.

18. A system according to claim 15, wherein the input device is a keyboard.

19. A system according to claim 15, wherein the input device is a reader for reading data from a data carrier.

20. A system according to claim 15, wherein the input device comprises a communications interface for receiving the reference password from a communications network.

21. A system according to claim 15, wherein the signal modification apparatus is operable to apply the modification by modifying transform coefficients of the information signal.

22. A system according to claim 21, wherein the transform coefficients are DCT or Wavelet coefficients.

23. A system according to claim 15, further comprising means for prompting a user to provide the reference password to the data processor via the input device.

24. Processing apparatus for copying an information signal to which is applied a substantially imperceptible modification representing copy control data including a password securely encoded according to a predetermined algorithm, the copying device comprising:
 a data processor operable to receive the modified information signal, and an input device for receiving a reference password separately from, and independently of, the modified information signal, and for providing the reference password to the data processor, the data processor being operable to
 a) derive the copy control data from the modified information signal upon reception of the modified signal, and
 b) compare the derived securely encoded password with the separately provided reference password securely encoded according to a predetermined algorithm; and
 c) a copying unit enabled by the data processor to copy the information signal if the securely encoded password derived from the information signal and the securely encoded reference password have a predetermined relationship.

25. A processing apparatus according to claim 24, wherein the data processor is arranged to securely encode the reference password according to the same algorithm as the derived password.

26. A processing apparatus according to claim 24, wherein the predetermined algorithm is a hash function.

27. A processing apparatus according to claim 24, wherein the input device is a keyboard.

28. A processing apparatus according to claim 24, wherein the input device is a reader for reading data from a data carrier.

29. A processing apparatus according to claim 24, wherein the input device comprises a communications interface for receiving the reference password from a communications network.

30. A processing apparatus according to claim 24, further comprising means for prompting a user to provide the reference password via the input device.

31. A computer program which when run on a suitable processing system implements the method of claim 1.

* * * * *